US008527436B2

(12) United States Patent
Salaka et al.

(10) Patent No.: US 8,527,436 B2
(45) Date of Patent: Sep. 3, 2013

(54) AUTOMATED PARSING OF E-MAIL MESSAGES

(75) Inventors: Vamsi Salaka, Sunnyvale, CA (US); Joy Thomas, Sunnyvale, CA (US)

(73) Assignee: Stratify, Inc., Mountain View, CA (US)

( * ) Notice: Subject to any disclaimer, the term of this patent is extended or adjusted under 35 U.S.C. 154(b) by 397 days.

(21) Appl. No.: 12/871,879

(22) Filed: Aug. 30, 2010

(65) Prior Publication Data

US 2012/0054135 A1 Mar. 1, 2012

(51) Int. Cl.
*G06N 5/00* (2006.01)

(52) U.S. Cl.
USPC .............................................. 706/13; 706/45

(58) Field of Classification Search
USPC ..................................................... 706/13, 45
See application file for complete search history.

(56) References Cited

U.S. PATENT DOCUMENTS

| | | | |
|---|---|---|---|
| 6,226,670 B1 | 5/2001 | Ueno et al. | |
| 6,581,105 B2 | 6/2003 | Miloslavsky | |
| 6,732,156 B2 | 5/2004 | Miloslavsky | |
| 6,816,885 B1 | 11/2004 | Raghunandan | |
| 6,981,020 B2 | 12/2005 | Miloslavsky | |
| 7,103,599 B2 | 9/2006 | Buford | |
| 7,174,366 B2 | 2/2007 | Chou | |
| 7,580,983 B2 | 8/2009 | Quine | |
| 7,689,652 B2 | 3/2010 | Mishra | |
| 2003/0195937 A1 | 10/2003 | Kircher, Jr. | |
| 2004/0102201 A1 | 5/2004 | Levin | |
| 2007/0043562 A1 | 2/2007 | Holsinger et al. | |
| 2007/0203784 A1 | 8/2007 | Keller et al. | |
| 2008/0095333 A1 | 4/2008 | Tudor | |
| 2008/0131006 A1 | 6/2008 | Oliver | |
| 2009/0112892 A1 | 4/2009 | Cardie et al. | |
| 2009/0150489 A1 | 6/2009 | Davis et al. | |
| 2009/0177745 A1 | 7/2009 | Davis et al. | |
| 2010/0082345 A1 | 4/2010 | Wang et al. | |

OTHER PUBLICATIONS

General Dynamics, HUMINT Extraction and Fusion System, AFRL-IF-RS-TR-2005-12, Final Technical Report, Jan. 2005, pp. 1-53.*
Balog, Krisztian et al.; "Finding Experts and their Details in E-mail Corpora"; 2006, *ACM*, Edinburgh, Scotland, 2 pages.
Chen, Hao et al.; "Integrating Geometrical and Linguistic Analysis for Email Signature Block Parsing"; 2000, *ACM*, pp. 343-366.
Emir, Burak et al.; "Intelligent Email Classifier Report"; 1999, *Swiss Federal Institute of Technology Lausanne*, 34 pages.
Ito, Keith; "Email Event extraction and Interpretation"; 2003, *CS22N Final Project*, 13 pages.
Zhang, Dong et al.; "Modeling Interactions from Email Communication"; 2006, *IDIAP Research Institute*, 4 pages.

(Continued)

*Primary Examiner* — Wilbert L Starks

(57) ABSTRACT

An automated parser for e-mail messages identifies component parts such as header, body, signature, and disclaimer. The parser uses a hidden Markov model (HMM) in which the lines making up an e mail are treated as a sequence of observations of a system that evolves according to a Markov chain having states corresponding to the component parts. The HMM is trained using a manually-annotated set of e-mail messages, then applied to parse other e-mail messages. HMM-based parsing can be further refined or expanded using heuristic post-processing techniques that exploit redundancy of some component parts (e.g., signatures, disclaimers) across a corpus of e-mail messages.

23 Claims, 10 Drawing Sheets

(56) References Cited

OTHER PUBLICATIONS

Einat Minkov et al., Extracting Personal Names from Email: Applying Named Entity Recognition to Informal Text, Proceedings of Human Language Technology Conference and Conference on Empirical Methods of Natural Language Processing, Vancouver, Oct. 2005 (8 pages).

Vitor R. Carvalho et al., Learning to Extract Signature and Reply Lines from Email, 2004 (8 pages).

Michael Collins, Discriminative Training Methods for Hidden Markov Models: Theory and Experiments with Perceptron Algorithms, Jul. 2002 (8 pages).

Wide R. Hogenhout et al., Robust Parsing Using a Hiddle Markov Model, 1998 (11 pages).

* cited by examiner

FIG. 2

From: joe@volcano.com
Sent: April 1, 2010  2:26 PM
To: meg@volcano.com, ggg@hhh.com
Subject: RE: Lunch plans How about that new Thai place?

Joe

⎫
⎬ 202
⎭

From: meg@volcano.com
Sent: April 1, 2010  2:15 PM
To: joe@volcano.com, ggg@hhh.com
Subject: RE: Lunch plans Sounds good.  Where should we go?

Meg

⎫
⎬ 204
⎭

200

-----
Megan L. Smith
Assistant to the Vice President
VolcanoCo, Inc.
meg@volcano.com
phone: 415-555-5555

220

From: ggg@hhh.com
Sent: April 1, 2010  1:03 PM
To: joe@volcano.com, meg@volcano.com
Subject: Lunch plans Hi Meg & Joe, Haven't seen you guys in ages. Want to meet for lunch tomorrow?

Gigi

206

--------
Gigi G. Grant, CPA
HHH.com – Your Source for Financial HHHelp

222

This message may contain confidential information. If you are not the intended recipient and received this message in error, any use or distribution of this message is strictly prohibited. Please also notify us immediately by return e-mail, and delete this message from your computer system. Thank you.

224

========================================
This e-mail (including any attachments) is intended only for use by the named addressees. It contains information that may be: (1) subject to the Attorney-Client Privilege, (2) an attorney work product, (3) confidential; and/or (4) otherwise protected from disclosure. If you are not the intended recipient of this e-mail, you are hereby notified that any use, dissemination, distribution or copying of this e-mail, and any attachments, is strictly prohibited.  Please immediately notify me by return e-mail and permanently delete the original and any copies. Unauthorized interception of this e-mail is a violation of federal criminal law. Thank you.
========================================

```
H ── From: joe@volcano.com
H ── Sent: April 1, 2010  2:26 PM
H ── To: meg@volcano.com, ggg@hhh.com
H ── Subject: RE: Lunch plans B ── How about that new Thai place?

B ── Joe

H ──── From: meg@volcano.com
H ──── Sent: April 1, 2010  2:15 PM
H ──── To: joe@volcano.com, ggg@hhh.com
H ──── Subject: RE: Lunch plans B ──── Sounds good.  Where should we go?

B ──── Meg

S ──── ----
S ──── Megan L. Smith
S ──── Assistant to the Vice President
S ──── VolcanoCo, Inc.
S ──── meg@volcano.com
S ──── phone: 415-555-5555

H ──── From: ggg@hhh.com
H ──── Sent: April 1, 2010  1:03 PM
H ──── To: joe@volcano.com, meg@volcano.com
H ──── Subject: Lunch plans B ──── Hi Meg & Joe, B ──── Haven't seen you guys in ages. Want to meet for lunch tomorrow?

B ──── Gigi

S ──── --------
S ──── Gigi G. Grant, CPA
S ──── HHH.com – Your Source for Financial HHHelp
D ──── This message may contain confidential information. If you are not the intended recipient
D ──── and received this message in error, any use or distribution of this message is strictly
D ──── prohibited. Please also notify us immediately by return e-mail, and delete this message
D ──── from your computer system. Thank you.

D ── ==========================================
D ── This e-mail (including any attachments) is intended only for use by the named addressees. It
D ── contains information that may be: (1) subject to the Attorney-Client Privilege, (2) an attorney work
D ── product, (3) confidential; and/or (4) otherwise protected from disclosure. If you are not the
D ── intended recipient of this e-mail, you are hereby notified that any use, dissemination, distribution
D ── or copying of this e-mail, and any attachments, is strictly prohibited.  Please immediately notify me
D ── by return e-mail and permanently delete the original and any copies. Unauthorized interception of
D ── this e-mail is a violation of federal criminal law. Thank you.
D ── ==========================================
D
```

200

AUTOMATED PARSING OF E-MAIL MESSAGES

BACKGROUND

The present disclosure relates generally to automated analysis of e-mail and in particular to automated parsing of e-mail into component sections such as headers, bodies, signatures, and disclaimers.

Business-related communication today occurs frequently via electronic mail (e-mail), with typical users sending and receiving a hundred or more messages a day. Under existing regulations, business e-mail is generally archived and made available to investigators (e.g., federal or state regulators, opponents in litigation). These investigators face the monumental task of sorting through a volume of e-mails that can exceed 100 messages per user per day over a period of years.

To deal with this overwhelming volume, investigators employ automated analysis tools. Such tools can, among other things, distinguish e-mails from other types of documents and extract information about sender, receiver, time and subject. Semantic classification tools (e.g., semantic clustering and/or categorization tools) can attempt to group e-mails related to similar subjects.

Existing automated document analysis tools are not optimized for e-mail processing. For example, e-mails frequently contain significant fractions of boilerplate, such as signature blocks, legal disclaimers or notices, and so on. In addition, e-mails often incorporate earlier e-mails as embedded or nested messages, e.g., when one person replies to or forwards a previous e-mail. Many automated analysis processes ignore these characteristics of e-mail entirely.

SUMMARY

Embodiments of the present invention provide tools for automated parsing, or identification of component parts, of an e-mail message (also referred to herein as an e-mail) such as header lines, body text, signature block, and disclaimer block. The parsing is achieved in part by employing a hidden Markov model (HMM) in which the various lines making up an e-mail are regarded as a sequence of observations of a system that evolves according to a Markov chain. The underlying Markov chain has a finite number of states corresponding to the e-mail parts that are to be distinguished, such as header, body, signature, and disclaimer. These states are not observed directly, but a state sequence can be inferred from the observed sequence of lines. Using a set of e-mail messages that has been manually annotated to associate a state with each line, parameters of the HMM can be established using a training process. The HMM can then be applied to parse other e-mail messages, including messages that have not been manually annotated.

In some embodiments, each line of an e-mail to be parsed is represented using a feature vector that indicates presence or absence within the line of each of some set of features. In some embodiments, features include textual features such as patterns of characters and/or specific character strings.

In some embodiments, results of the HMM parsing can be further refined or expanded using heuristic post-processing techniques. These techniques rely on the fact that some parts of an e-mail, such as signatures and disclaimers, are expected to consist largely of boilerplate that is repeated across a potentially large number of e-mails. For example, a given sender typically uses the same signature for months at a time (or longer), so redundancy in signature blocks can be expected across e-mails from one sender. Similarly, disclaimer language is often established by an organization or individual user and automatically appended to e-mails sent by that organization or user. The language changes slowly with time, and consequently redundancy in disclaimer language can be expected across e-mails from a given organization or user. Patterns based on redundant blocks across e-mails can be detected and used to refine the parsing. Such patterns can also be used to facilitate other types of e-mail analysis.

Some aspects of the present invention relate to methods for analyzing e-mail messages. An e-mail analyzer is based on a hidden Markov model that models associations between lines of an e-mail and a set of line types (e.g., header, body, signature, disclaimer). The e-mail analyzer can be trained using a set of training e-mail messages. The trained e-mail analyzer can then be applied to a target e-mail message to assign each line of the target e-mail message to one of the line types, Annotations for the target e-mail message can be stored in a data store; the annotations can indicate the assigned line type for each line of the target e-mail message.

In some embodiments, the e-mail analyzer can be trained by manually associating each of the lines of each of the training e mail messages with one of the line types and creating a feature vector representation for each line of each of the training e-mail messages. A forward-backward algorithm can be applied to the manual associations and the feature vector representations to optimize parameters associated with the hidden Markov model. The parameters can be validated using validation e-mail messages whose lines have also been manually associated with the line types; if the results are not acceptable, the training can be continued with additional training e-mail messages.

In some embodiments, the e-mail analyzer can be applied by creating a feature vector representation for each line of the target e mail message and using a Viterbi algorithm and the optimized parameters associated with the hidden Markov model to determine a most probable line type for each line of the target e-mail message; the line can be assigned to the most probable line type.

In some embodiments, multiple target e-mail messages can be analyzed to assign each line of each target e-mail message to a line type. From each target e-mail messages, a block of consecutive lines that were each assigned to a first one of the line types can be extracted. (The first line type can be a type expected to have a high degree of redundancy across the e-mail messages. For example, signature lines across a set of e-mail messages from the same sender are likely to be very similar to each other, as are disclaimer blocks across a set of e-mail messages the same sender. In some cases, disclaimer blocks across e-mail messages from senders in the same organization or group may be highly similar. Clusters of the blocks can be formed based on similarity of lines in different blocks, and for each cluster, a representative block can be determined. Line type assignments for at least some of the lines of at least some of the target e-mail messages can be modified based on the representative blocks determined for the plurality of clusters.

The following detailed description together with the accompanying drawings will provide a better understanding of the nature and advantages of the present invention.

BRIEF DESCRIPTION OF THE DRAWINGS

FIG. 2 illustrates an e-mail message that can be analyzed in accordance with an embodiment of the present invention.

FIG. 4 shows an annotated version of the e-mail message of FIG. 2.

DETAILED DESCRIPTION

Figure 1:
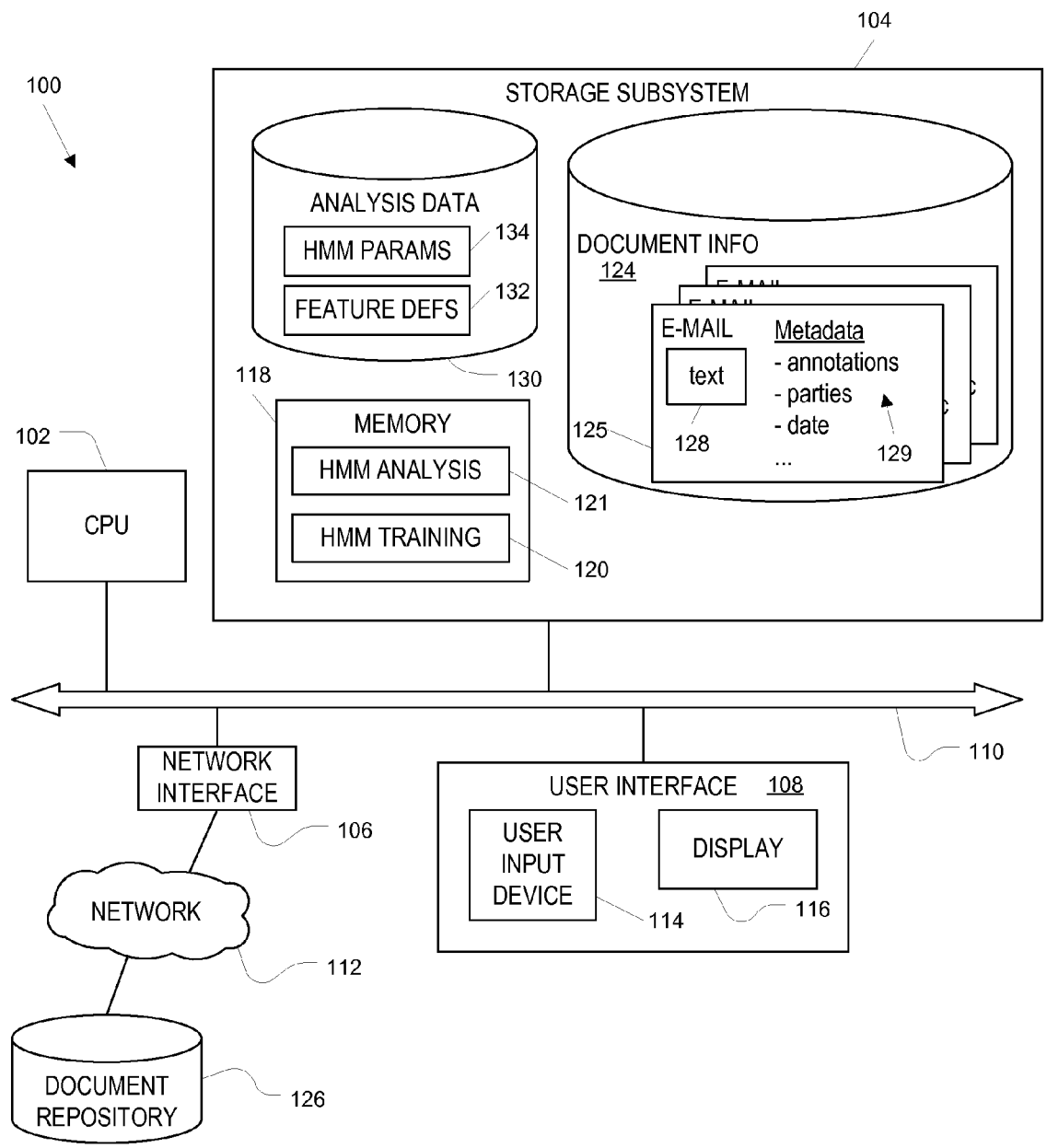
FIG. 1 is a block diagram of a computer system according to an embodiment of the present invention.

Many existing tools for automated e-mail analysis treat all lines of an e-mail message (with the possible exception of header lines) as having equal significance when in fact this is not the case. As is well known, an e-mail message can include "boilerplate" such as a signature block that may identify and/or provide information about the sender and a legal disclaimer block that may contain information as to whether the e-mail message is considered subject to evidentiary privilege or confidentiality rules.

Embodiments of the present invention provide tools for automated parsing, or identification of component parts, of an e-mail message (also referred to herein as an e-mail) such as header lines, body text, signature block, and disclaimer block. The parsing is achieved in part by employing a hidden Markov model (HMM) in which the various lines making up an e-mail are regarded as a sequence of observations of a system that evolves according to a Markov chain. The underlying Markov chain has a finite number of states corresponding to the e-mail parts that are to be distinguished, such as header, body, signature, and disclaimer. These states are not observed directly, but a state sequence can be inferred from the observed sequence of lines.

The task of associating a line of e-mail with a state in the Markov chain is facilitated in part by generating a feature vector for each line. The feature vector can be a vector of bits with each bit set to "1" or "0" depending on whether a particular feature is present or absent in the line. In some embodiments, features are defined based on presence or absence of specific textual features such as patterns of characters and/or specific character strings. In some embodiments, selection of features is optimized based on information content of particular features (e.g., determined from a training set of e-mails), reducing the nearly infinite set of possible lines of an e-mail to a smaller and clearly defined feature vector space.

Using a set of e-mail messages that has been manually annotated to associate a state with each line and the feature vectors, parameters of the HMM can be established using a training process. The HMM can then be applied to parse other e-mail messages, including messages that have not been manually annotated.

In some embodiments, results of the HMM parsing can be further refined or expanded using heuristic post-processing techniques. These techniques rely on the fact that some parts of an e-mail, such as signatures and disclaimers, are expected to consist largely of boilerplate that is repeated across a potentially large number of e-mails. For example, a given sender typically uses the same signature for months at a time (or longer), so redundancy in signature blocks can be expected across e-mails from one sender. Similarly, disclaimer language is often established by an organization or individual user and automatically appended to e-mails sent by that organization or user. The language changes slowly with time, and consequently redundancy in disclaimer language can be expected across e-mails from a given organization or user. Patterns based on redundant blocks across e-mails can be detected and used to refine the parsing. Such patterns can also be used to facilitate other types of e-mail analysis, examples of which are described below.

System Overview

FIG. 1 is a block diagram of a computer system 100 according to an embodiment of the present invention. Computer system 100 includes a CPU 102, storage subsystem 104, network interface 106, and user interface 108 connected via a bus 110. CPU 102 can be, e.g., any programmable general-purpose processor. Network interface 106 provides access to one or more other computer systems via a network 112, which can include, e.g., a local area network (LAN), a wide area network (WAN), the Internet (a globally interconnected network of computer networks), a virtual private network, and so on. Network interface 106 can be implemented using standard protocols, including wired protocols (e.g., Ethernet) and/or wireless protocols (e.g., any IEEE 802.11 protocol). User interface 108 can include one or more input devices 114 such as a keyboard, mouse, touch screen, touch pad, etc., and one or more output devices such as a display 116. Bus 110 can be implemented using conventional bus architectures and may include bridges, bus controllers, and the like.

Storage subsystem 104 incorporates various computer-readable storage media to provide storage for programs and data accessed by CPU 102 and/or other components of computer system 100. In the embodiment shown, storage subsystem 104 includes primary memory 118. Primary memory 118 provides the fastest access times and can be implemented using known memory technologies such as DRAM (dynamic random access memory) and/or SRAM (static random access memory). Primary memory 118 is advantageously used at any given time to store programs and/or data that are actively in use by CPU 102. Thus, for example, memory 118 is shown as storing an HMM training program 120 that, when executed, causes CPU 102 to process a training set of e-mails to optimize parameters for a hidden Markov model. Memory 118 in this example also stores an HMM analysis program 121 that, when executed, causes CPU 102 to analyze a corpus of e-mails using HMM parameters determined by HMM training program 120, thereby parsing the e-mail to identify component parts thereof. Memory 118 can also store other programs, such as programs implementing heuristic-based post-processing of e-mails that have been parsed using HMM analysis program 121, as well as data used by executing programs and/or other information as desired.

Storage subsystem 104 in this embodiment also provides various secondary storage areas, which can include, e.g., magnetic media such as conventional hard or floppy disks, optical media such as compact disc (CD), digital versatile disc (DVD), or the like, and/or semiconductor media such as flash memory. Secondary storage areas generally have longer access time than primary memory 118 but have larger storage capacity. In this example, secondary storage areas are provided for an analysis data store 130 and a document information data store 124.

Document information data store 124 provides information (also referred to as metadata) about a corpus of documents, which in embodiments of the present invention includes e-mails and can optionally include other types of documents. As used herein, a "corpus" of documents can be any collection of documents about which information is to be provided to a user of system 100. In one embodiment, the corpus of documents (or a portion thereof) can be stored in a document repository 126 that is remote from computer system 100 and accessible via network interface 106 and network 112. In another embodiment, the corpus (or a portion thereof) can be stored locally, e.g., within storage subsystem 104. The corpus can be centralized or distributed (e.g., it can be a collection of World Wide Web documents that are stored on respective web servers connected to network 112 as is known in the art) as desired, and document information data store 124 might or might not contain actual documents.

Document information data store 124 in some embodiments stores e-mail records 125. An e-mail record 125 represents an e-mail message. In one embodiment, e-mail record 125 can include e-mail text 128, which can be a plain-text representation of the e-mail's content, as well as metadata 129 descriptive of the e-mail. Examples of metadata 129 can include parties to the e-mail (e.g., sender and recipient information extracted from e-mail headers), date and time of sending and/or receiving the e-mail, and other information that can be associated with an e-mail by an automated or manual analysis process. In particular, metadata 129 can include annotations determined using HMM analysis program 121. Such annotations can identify, for example, an e-mail part (e.g., header, body, signature, disclaimer) associated with each line of text 128.

Document information data store 124 can also include any other information about the e-mails and any other documents in the corpus, such as dates of creation, editing, and/or addition to the corpus; type of document (e.g., e-mail, web page, word processor document); author; source or location from which the document was obtained; a condensed representation of document content in a readily searchable form; language information; keywords; categorization information; and so on. In some embodiments, document information data store 124 provides a relational database containing document information.

Analysis data store 130 in this embodiment provides data that can be referenced by programs executing on CPU 102, e.g., HMM training program 120 and/or HMM analysis program 121. For example, analysis data store 130 can include feature definitions 132. As described below, feature definitions 132 can include a series of rules applicable to a line of text, such as a line of an e-mail, that test for the presence or absence of various semantic or typographic features. Feature definitions 132 can be used by HMM training program 120 and/or HMM analysis program 121 to convert lines of e-mail text 128 to feature vectors for use in parsing of the e-mail. HMM parameters 134 can include optimized parameters for a hidden Markov model applicable to e-mail parsing. Parameters 134 can be generated by HMM training program 120 and applied by HMM analysis program 121. Analysis data store 130 can also include other data usable in analysis of e-mails and/or other documents.

It will be appreciated that computer system 100 is illustrative and that variations and modifications are possible. For example, although storage subsystem 104 is shown as local to system 100, in alternative embodiments, all or part of storage subsystem 104 can be implemented as remote storage, e.g., on a storage area network (SAN) or other remote server accessible via network 112. Thus, for example, document information data store 124 and/or analysis data store 130 can be stored locally or remotely as desired. Further, although HMM training program 120 and HMM analysis program 121 are shown as residing in primary memory 118, the invention is not limited to any particular mechanism for supplying program instructions for execution by CPU 102. For instance, at any given time some or all of the program instructions for HMM training program 120 or HMM analysis program 121 may be present within CPU 120 (e.g., in an on-chip instruction cache and/or various buffers and registers), in a page file or memory mapped file on a system disk, and/or in other local or remote storage space. In some embodiments, computer system 100 might be implemented as a server accessible to a user via a network, and user interface 108 is optional. Computer system 100 may also include additional components such as floppy disk drives, optical media drives (e.g., CD or DVD), network interface components, USB interface, and the like. Computer system 100 can be configured with many different hardware components and can be made in many dimensions and styles (e.g., laptop, tablet, server, workstation, mainframe); network connections may be provided via any suitable transport media (e.g., wired, optical, and/or wireless media) and any suitable communication protocol (e.g., TCP/IP). A particular computer architecture or platform is not critical to the present invention.

A Hidden Markov Model for E-Mail

FIG. 2 illustrates an e-mail message 200 that can be analyzed in accordance with an embodiment of the present invention. E-mail 200 includes a reply message 202 that has earlier messages 204, 206 embedded (or nested) therein. It should be noted that a corpus of e-mail messages may include separate copies of messages 204 and 206. For a person viewing e-mail 200, it is relatively simple to distinguish the embedded messages. Further, by disregarding boilerplate (such as signature blocks 220, 222 and disclaimers 224, 226), a person can readily recognize that the topic of e-mail 200 relates to setting up a lunch meeting.

However, for an automated process, the subject matter of e-mail 200 might not be so immediately clear, especially if all portions of e-mail 200 are treated alike.

The automated analysis processes described below can parse an e-mail message such as e-mail 200 into different segments, such as headers, body text, signature blocks, and disclaimers. Such parsing can facilitate further analysis, such as determining the subject matter of e-mail 200 and/or determining whether e-mail 200 is likely to be protected by an evidentiary privilege (e.g., attorney-client privilege). In another example, signature blocks associated with a particular sender can be analyzed, yielding information about that sender's role in the organization and possibly changes in that role over time.

In embodiments described herein, e-mail parsing is automated using a hidden Markov model (HMM). An e-mail can be regarded as a Markov chain, i.e., a system that, at any given time period, exists in one of a finite number of possible states and in which the probability of transitioning from the current state to another depends only on the current state. In the case of e-mail, the "time period" can correspond to a line of the e-mail, and the states can correspond to different types of lines, such as header, body, signature, and disclaimer. It is assumed that an e-mail can have any number of lines corresponding to a given state and the probability of state changes between one line and the next can be modeled without reference to preceding or succeeding lines.

Figure 3:
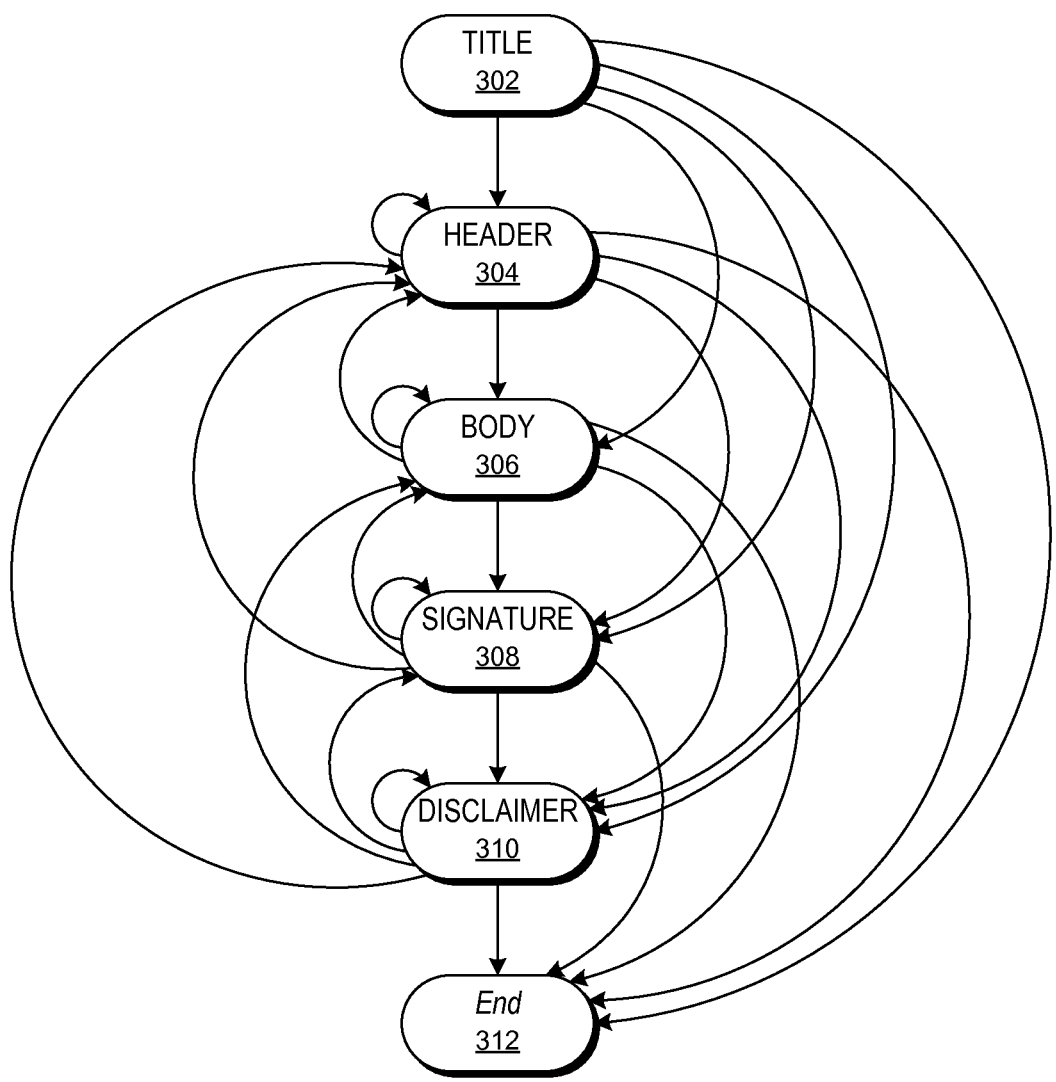
FIG. 3 is a state diagram for an e-mail message according to an embodiment of the present invention, showing states and transitions.

FIG. 3 is a state diagram for an e-mail according to an embodiment of the present invention, showing states and transitions. The nodes (ovals) represent states, and the arrows represent possible transitions. In this embodiment, a state transition occurs at each line, and a "transition" to the same state is allowed. Each line of an e-mail belongs to exactly one of the defined states; in most instances, the next line can belong to the same state or another state.

In this particular state model, an e-mail starts with a title 302. The title can be assigned by the e-mail system or a document analysis system as described herein. The title is typically extracted from the subject header line of the e-mail (e.g., the first line of the e-mail that begins with the keyword "Subject:"). In some embodiments, an e-mail can have multiple title lines, so that a transition from title state 302 to itself is permitted.

Header state 304 corresponds to a header line. Header lines are typically automatically generated by an e-mail system based in part on information supplied by an e-mail sender. Examples include a "From" line that identifies the sender, "To," "CC," and "BCC" lines that identify intended recipients, "Sent" and "Received" lines that provide the date and time when the e-mail was sent and received, "Subject" line that includes a subject specified by the sender, and so on. In the model of FIG. 3, it is assumed that at least one header line will precede other portions of an e-mail, given that such headers are expected and relied on by e-mail systems. (Other models can be used, and this assumption is not required.) An e-mail may have multiple successive header lines; the number is not fixed, and a transition to another state may occur after any number of header lines.

Body state 306 corresponds to lines of text, generally provided by an e-mail sender. (The sender can be a person or an automated process, and the analysis process can be unaffected by the manner in which body text or any other portion of an e-mail was generated.) An e-mail body can include unstructured natural language; some e-mail bodies can include tables or other more structured information. There can be any number of lines of body.

Signature state 308 corresponds to a line of a signature block. As used herein, a "signature block" in an e-mail refers to a group of lines that include information about the sender, such as name, job title, contact information (e-mail address, postal address, phone number), company name, a website address for the individual or company, and the like, e.g., as in signature blocks 220, 222 of FIG. 2. As is known, a signature block can be predefined and automatically or manually inserted into an e-mail message during composition or sending; analysis as described herein is independent of any particular method of creating a signature.

Disclaimer state 310 corresponds to a line of a disclaimer block. As used herein, a "disclaimer block" in an e-mail refers to a group of lines containing warnings, advisory languages, or other legal notices, e.g., as in disclaimer blocks 220, 222 of FIG. 2. Such text is typically directed to intended or unintended recipients, e.g., warning against unauthorized use or distribution of the e-mail or indicating that the e-mail may include confidential or privileged information. Like a signature block, a disclaimer block can be predefined and automatically or manually appended to an e-mail message during composition. In some instances, an e-mail server can be programmed to automatically add a disclaimer block when sending e-mails.

End state 312 marks the end of the e-mail and is reached after the last line; once this state is reached, no further transitions occur. In some embodiments, different states have different probability of transitioning to end state 312, and explicitly including this final transition in the model can improve the reliability of the results.

As shown, many transitions are possible. For example, header state 302 can transition to body state 304 or directly to signature state 306 or disclaimer state 308 (as might happen if a user forwards a message without adding any content). In another example, body state 306 can transition directly to the end of the message (as might happen if the sender doesn't use a signature or disclaimer block). In addition, a message can end from any state.

To further illustrate states and transitions in an e-mail message, FIG. 4 shows an annotated version of e-mail 200 of FIG. 2. In FIG. 4, each non-blank line has been labeled as header (H), body (B), signature (S), or disclaimer (D). In this example, blank lines are not labeled; however, in some embodiments, blank lines are annotated. For example, a blank line can be assigned to the same state as the immediately preceding line. Transitions occur from header to body, from body to header, from body to signature, from signature to header, and from signature to disclaimer, as well as from header to header, from body to body, from signature to signature, and from disclaimer to disclaimer.

However, as can be seen from FIG. 4, the underlying Markov chain (in this case the state sequence HHHHBB . . . ) is not overt. Simply looking at a line in isolation may not provide enough information to determine whether it is, for instance, part of the body or a disclaimer. Accordingly, some embodiments of the present invention use a hidden Markov model for e-mail analysis. In a hidden Markov model, it is assumed that there is an underlying Markov chain (e.g., the state sequence of FIG. 4), but the states are not directly observed. Instead, an observation has a probability of occurrence associated with each state.

More specifically, an e-mail can be modeled as an N-state Markov chain. (In the example of FIG. 3, N=6). Defining $q_t$ as the state at an observation point t (where each line of the e-mail is regarded as an observation point), the state transition probability can be represented using a matrix $A=[a_{ij}]$ where:

$$a_{ij}=P(q_t=j|q_{t-1}=i), \quad \text{Eq. (1)}$$

for $1 \leq i, j \leq N$. Here, P(X|Y) is used to denote the probability of the occurrence of event X given the occurrence of event Y. Thus, $a_{ij}$ is the probability of the e-mail transitioning from state i at line t−1 to state j at line t. As usual, probabilities are defined on the interval [0, 1], and for a Markov chain, it is required that:

$$\sum_{j=1}^{N} a_{ij} = 1, \quad \text{Eq. (2)}$$

i.e., the system always transitions among the N states. It is also assumed that the transition probability is not history-dependent; in other words $a_{ij}$ is independent of t. Finally, it is assumed that at t=0 (the first line of the e-mail), the state ($q_0$) of the e-mail has an initial probability distribution $\pi=\{\pi_i\}_{i=1}^{N}$, where $\pi_i$ is defined as:

$$\pi_i=P(q_0=i). \quad \text{Eq. (3)}$$

It follows that the probability of a particular state sequence $q=(q_0, q_1, q_2, \ldots, q_t)$ occurring at successive observations is:

$$P(q|A,\pi)=\pi_{q_0} a_{q_0 q_1} a_{q_1 q_2} \ldots a_{q_{t-1} q_t}. \quad \text{Eq. (4)}$$

In case of automated e-mail parsing, the state sequence q is not directly observed. Instead, what is observed is a line sequence $\theta=(\theta_0, \theta_1, \ldots, \theta_t)$. θ The production of line sequence $\theta$ is stochastic and is governed by a set B of observation probabilities defined as:

$$B=\{b_i(\theta_t)\}_{i=1}^N, \quad \text{Eq. (5)}$$

where $$b_i(\theta_t)=P(\theta_t|q_t=i). \quad \text{Eq. (6)}$$

The parameters $\pi$, A, and B are not known a priori but can be determined, at least approximately, by analyzing a training set of e-mails for which the state sequence q that led to the observation sequence $\theta$ is known. Where q is known, the probability of observation sequence $\theta$ is characterized by:

$$P(\theta|q,B)=b_{q_0}(\theta_0)b_{q_1}(\theta_1)\ldots b_{q_t}(\theta_t). \quad \text{Eq. (7)}$$

The joint probability distribution of the observation sequence and the state sequence of an email having T lines is the product of Eqs. (4) and (7):

$$P(\theta, q \mid \pi, A, B) = \pi_{q_0} \prod_{t=1}^{T} a_{q_{t-1}q_t} b_{q_t}(\theta_t). \quad \text{Eq. (8)}$$

The triple $\lambda=(\pi, A, B)$ representing the assumed conditions in Eq. (8) defines a Hidden Markov Model (HMM). Further, from Eq. (8) the probability of a give sequence $\theta$ of lines in an email can be expressed as:

$$P(\theta \mid \pi, A, B) = \sum_q P(\theta, q \mid \pi, A, B) = \sum_q \pi_{q_0} \prod_{t=1}^{T} a_{q_{t-1}q_t} b_{q_t}(\theta_t). \quad \text{Eq. (9)(V4)}$$

where T is the total number of lines in the e-mail and the sum is taken over all state sequences q.

As described below, in embodiments of the present invention an HMM for parsing e-mail is trained using a training set of e-mails in which the state sequence q is known and the lines $\theta_t$ are represented using feature vectors. The training process sets values for the HMM parameters ($\pi$, A, B). Once trained, the model can be applied to parse additional e-mails in which the state sequence q is not previously known. Examples of training and application are described below.

E-Mail Analysis—Overview

Figure 5:
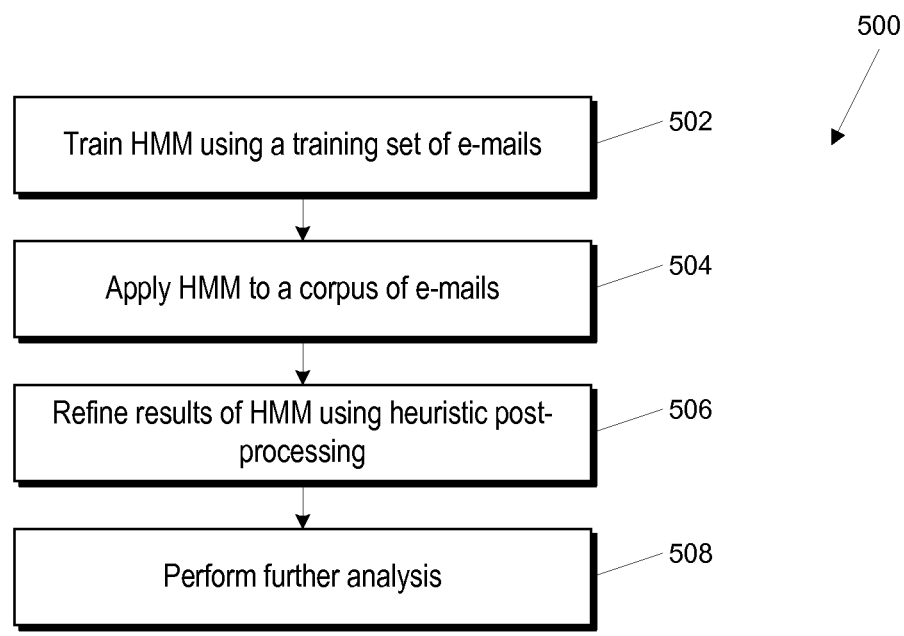
FIG. 5 is a flow diagram of an e-mail analysis process according to an embodiment of the present invention.

FIG. 5 is a flow diagram of an e-mail analysis process 500 according to an embodiment of the present invention. Process 500 starts with training a hidden Markov model at block 502. The HMM can use the states described above or some other set of states. An example of a training process is described below with reference to FIG. 6. At block 504, the HMM is applied to parse e-mails from a corpus of e-mails. An example of an HMM application process is described below with reference to FIG. 7. At block 506, results from the HMM analysis can be refined using heuristic post-processing techniques. Examples of such techniques are described below with reference to FIGS. 9 and 10. At block 508, the results can be used in various ways to facilitate further automated and/or manual analysis of a corpus of e-mails; examples are described below.

E-Mail Parsing—Training

Figure 6:
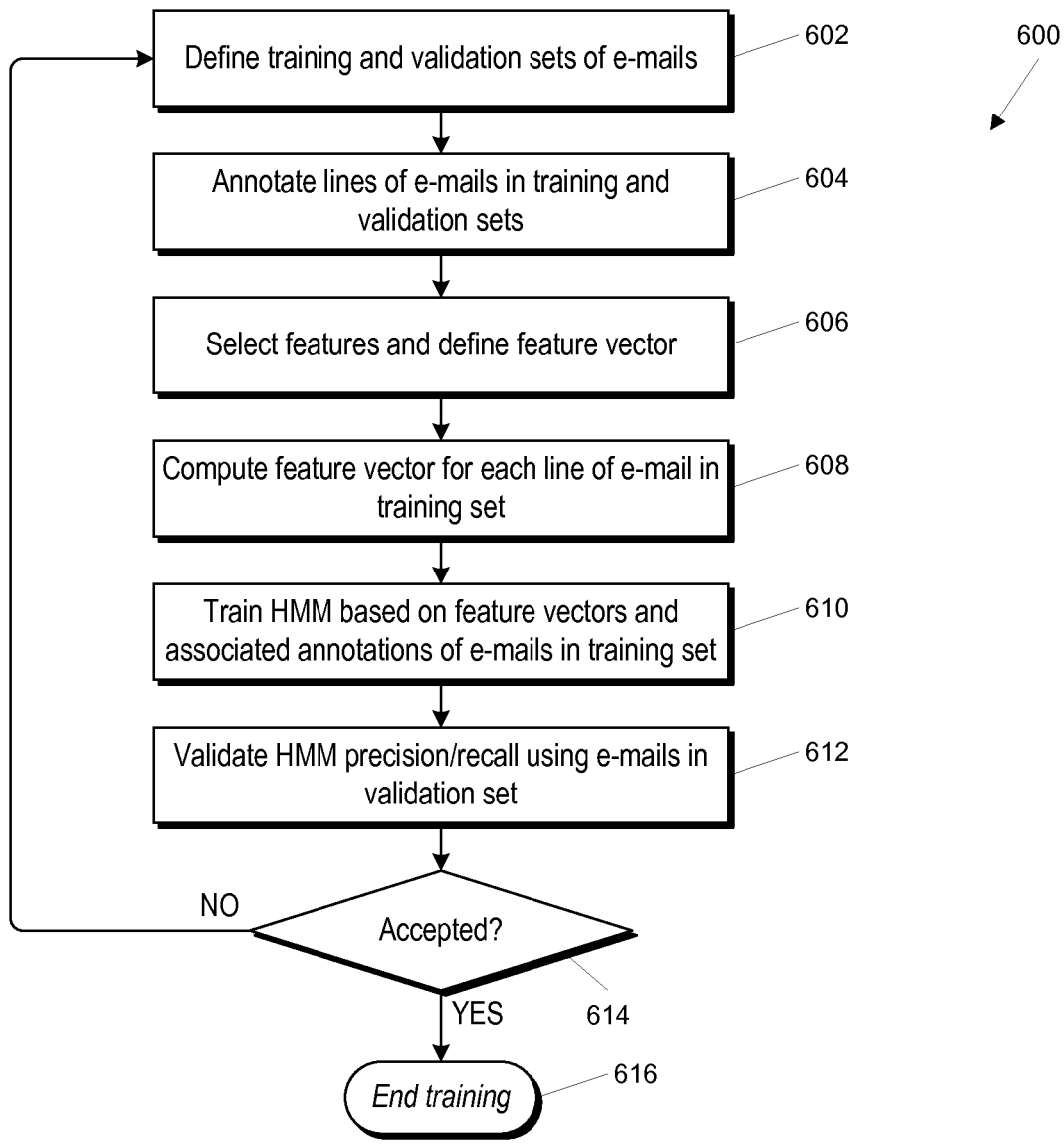
FIG. 6 is a flow diagram of a process for training a hidden Markov model to parse e-mails according to an embodiment of the present invention.

FIG. 6 is a flow diagram of a process 600 for training an HMM to parse e-mails according to an embodiment of the present invention. Process 600 can be implemented, e.g., in HMM training program 120 shown in FIG. 1.

At block 602, training and validation sets of e-mails are defined. As described below, the training set is used to determine, or train, parameters of the HMM, while the validation set is used to assess the performance of the trained HMM. In some embodiments, a large corpus of e-mails is identified and a subset of the e-mails are selected at random. This subset is further divided into a training set and a validation set, e.g., by random selection. Other techniques for selecting representative samples from a large population can be used. The size of the training and validation sets can be varied. For example, a training set can include 100, 200, 500 or some other number of e-mails while the validation set (which can be smaller) can include 50, 100, 300 or some other number of e-mails. In general, a larger training set is likely to produce a more accurate model; the improved accuracy can be balanced against increased training time. As described below, training can be performed iteratively, adding additional e-mails to the training set, until a desired accuracy is achieved.

At block 604, e-mails in the training and validation sets are annotated to associate each line with one of the possible states of the HMM. In some embodiments, the HMM is based on the states shown in FIG. 3, although other states or combinations of states could be substituted. This annotation is advantageously done manually, e.g., by having a team of editors look at each e-mail and assign a state to each line. In some embodiments, any blank lines are simply ignored and only lines containing at least one non-blank character are assigned to states. In other embodiments, blank lines are also assigned to states; for example, any blank line can be assigned to the same state as the previous line. The annotations can be captured, e.g., in an XML representation of the e-mail or other data structure that associates each line with its annotation.

At block 606, a set of features that can be used to represent a line of e-mail is selected. In some embodiments, each feature is defined by a regular expression test (which can include a single regular expression search or a logical combination of multiple regular expression searches). This test can be applied to each line of an e-mail to determine whether the regular expression occurs in the line or not. Any property that can be detected using a regular-expression test can be selected as a feature. Examples of features that can be used include the following:

(1) Whether the line contains a keyword or character string associated with an e-mail header, e.g., From:, To:, CC:, BCC:, Date: or the like.

(2) Whether the line contains e-mail address syntax. An e-mail address can be detected, e.g., by finding a string of the form *@*.*, where each instance of * represents a string of non-blank characters unspecified length.

(3) Whether the line contains URL (uniform resource locator) syntax. URLs can be recognized by looking for standard initial strings such as http://, https://, ftp:// and so on. Alternatively, URLs might be recognized as strings of the form *.*.*, where again each * represents a string of non-blank characters of unspecified length. Any strings containing "@" can be excluded to distinguish URLs from e-mail addresses.

(4) Whether the line contains phone number syntax. Phone numbers can be recognized as regular expressions that follow a pattern of digits and separators such as (###)###-#### or ###-###-####, where each # represents a digit (0-9). Other patterns typical for phone numbers can be used in addition to or instead of these examples.

(5) Whether the line has contiguous text. In one embodiment, "contiguous text" is defined as having at least a minimum number (e.g., 50) of continuous alphanumeric characters.

(6) Whether the line includes disclaimer words. Words that are commonly found in e-mail disclaimer blocks—such as privilege, confidential, prohibited, unauthorized, and the like—can be detected as disclaimer words. In some embodiments, presence or absence of different disclaimer words can be represented as different features; in other embodiments a single feature can be associated with the occurrence of any or all of multiple disclaimer words.

(7) Whether the line includes a date. Dates can be recognized by looking for numerical formats typical of dates (e.g., dd-mm-yyyy), the presence of a month name next to a number, or other distinctive character strings.

(8) Whether the line contains personal-name syntax or a known name. Personal names can be recognized by various patterns, e.g., a pair of consecutive words starting with a capital letter, sequences that look like Xx . . . x I. Yyy . . . y (where X, x, I, Y and y represent letters), or the like. In some instances, a list of common names (e.g., given names and/or family names) can be provided, and presence of a known name can be detected by matching a character string from the line to a name on the list.

(9) Whether the line contains role or title keywords. Such keywords can include typical job names, e.g., Partner, Assistant, Vice President, Paralegal, and/or indicators of job-related credentials such as M.B.A., M.D., C.P.A., Esq., or the like.

(10) Whether the line contains street address syntax. For example, #### Somename Street or Cityname ST #### illustrate common patterns associated with street addresses in the US. Such patterns can be recognized using regular expression tests.

(11) Whether the line is blank. (Alternatively, in some embodiments, blank lines are simply ignored.)

In preferred embodiments, multiple features, e.g., including some or all of the examples described above, are selected to define a feature vector. The feature vector can be a bit vector constructed based on whether the regular expression test associated with each feature is satisfied or not. For example, if 11 features (e.g., the features listed above) are used, the length of the bit vector would be 11, with one bit associated with each feature. Thus, the possible number of feature-vector values could be as high as $2^{11}$, or 2048. (Depending on how the features are defined, some of the 2048 values might be logically impossible. For example, in the feature list above, the eleventh feature, a blank line, is mutually exclusive with all of the first ten.)

Since the training set generally should be at least as large as the number of possible feature vectors, it can facilitate training to further prune the set of allowed feature vectors to ensure the accuracy of the HMM while reducing the time complexity of the training and prediction processes.

In one embodiment, the set of features can be pruned based on criteria of frequency and information gain. Frequency measures how often a particular feature occurs across a set of e-mails. Features that occur only rarely are unlikely to be helpful in identifying states. Accordingly, features that do not meet a minimum frequency threshold can be pruned from the selection at block 606.

Information gain quantifies the number of bits of information obtained for the state prediction by knowing the presence or absence of a feature. Let $\{s_i\}_{i=1}^{N}$ denote the set of states to be classified in an email. The information gain G of a feature f is defined to be:

$$G(f) = -\sum_{i=1}^{N} P(s_i) \log P(s_i) + P(f)\sum_{i=1}^{N} P(s_i|f)\log P(s_i|f) + P(\bar{f})\sum_{i=1}^{N} P(s_i|\bar{f})\log P(s_i|\bar{f}),$$ Eq. (10)

where f denotes presence of the feature and $\bar{f}$ denotes absence of the feature. Given a training set of e-mails, the probabilities in Eq. (10) can be determined, and G(f) can be computed for each feature under consideration. Features whose information gain is lower than a threshold can be pruned from the selection at block 606.

Additional pruning of the set of possible feature vector values can also be performed. For example, the above pruning techniques based on frequency and information gain can be used to prune feature vector values that occur only rarely or that provide little information gain, in addition to or instead of pruning the set of features. Thus, a subset of the possible feature vector values can be selected as "allowed," with the rest being "forbidden."

Where the set of feature vector values is pruned, it is possible that, for some line of an e-mail, the feature vector will have a forbidden value. In some embodiments, such lines can simply be ignored during the HMM analysis. (Any such lines can simply be assigned to the same state as a preceding line.) In other embodiments, a closest feature vector in the allowed set can be identified. For example, where the feature vector is a bit vector, it is possible to define a closest allowed feature vector using an algorithm similar to an "edit distance" algorithm, in which the distance between the actual feature vector and an allowed feature vector is defined as the number of "1"s in the actual feature vector that have to be replaced by "0" to arrive at the allowed feature vector. (Distance is not defined for the case where a "0" in the actual feature vector would have to be replaced by a "1"). The closest actual feature vector is the vector that requires the fewest replacements. In the case where two or more allowed feature vectors are equally close to the actual feature vector, the selection can be based on frequency of the feature vectors in question (e.g., choose the most frequent).

At block 608, the feature definitions selected at block 606 are applied to create a feature vector for each line of each e-mail in the training set.

At block 610, the HMM, e.g., defined by parameters $\lambda=(\pi, A, B)$ as described above, is trained using the feature vectors and annotations for the e-mails in the training set. In one embodiment, training applies a method of maximum likelihood estimation (MLE) to choose $\lambda$ such that $P(\theta, q|\lambda)$ as defined in Eq. (8) above is maximized for the given training sequence $\theta$. One suitable method uses the Baum-Welch algorithm (Baum, L., Egon, J., "An Inequality with Applications to Statistical Estimation for Probabilistic Functions of a Markov Process and to a Model for Ecology," *Bull. Am. Math. Soc.* 73, 360-363 (1967)), which accomplishes this objective in a two step procedure. Based on an existing model $\lambda'$, the first step transforms the objective function $P(\theta, q|\lambda)$ into a new function $Q(\lambda|\lambda')$ that measures the divergence between the initial model $\lambda'$ and an updated model $\lambda$. The Q function is defined as:

$$Q(\lambda|\lambda') = \sum_{q} P(\theta, q|\lambda')\log P(\theta, q|\lambda),$$ Eq. (11)

where $P(\theta, q|\lambda)$ is given by Eq. (8).

The second step is the maximization step. Here, the Q function is maximized to determine a parameter set $\lambda=\lambda_1$ that maximizes the Q function. The algorithm continues by replacing $\lambda'$ with the newly determined $\lambda_1$ and repeating the two steps till a stopping criterion is met. In one embodiment, the stopping criterion is met if the difference in likelihood estimates between successive iterations is less than 0.1%.

The Baum-Welch algorithm is a forward-backward algorithm of a general hill climbing type and parallels closely the Expectation-Maximization (EM) algorithm. Other similar algorithms can be substituted.

At block 612, the trained HMM is validated using the e-mails in the validation set. Like the e-mails in the testing set, those in the validation set have been manually annotated (e.g., at block 604). Validation can include using the trained HMM to "predict" a state sequence for an e-mail in the validation set (examples of suitable prediction techniques are described below) and comparing the predicted state sequence to the known actual state sequence of the e-mail. This provides a mechanism for assessing the performance of the HMM. For example, precision can be measured by determining, the fraction of lines that are assigned to the correct state. As another example, recall can be measured by determining the fraction of blocks (groups of consecutive lines) that are correctly assigned to a state. For example, recall can be measured based on the fraction of signature blocks (or disclaimer blocks or header blocks, etc.) that are correctly identified as such.

At block 614 a decision is made whether to accept the HMM training result. This decision can be based on the performance metrics obtained during validation at block 612. In one embodiment, the result is accepted if precision is above 95% and recall is above 85%; other criteria can be used. If the HMM is accepted, training ends at block 616. The HMM parameters and feature vector definitions can be saved (e.g., in analysis data store 130 of FIG. 1) for use in analyzing other e-mails.

If the HMM is not accepted in block 614, training can be restarted. In some embodiments, restarting includes selecting different training and/or validation sets at block 602. In other embodiments, the same training and/or validation sets can be used, but feature definitions can be changed at block 606. Process 600 can continue, refining feature definitions and HMM parameters until an acceptable level of performance is achieved.

E-Mail Parsing: Analysis

Figure 7:
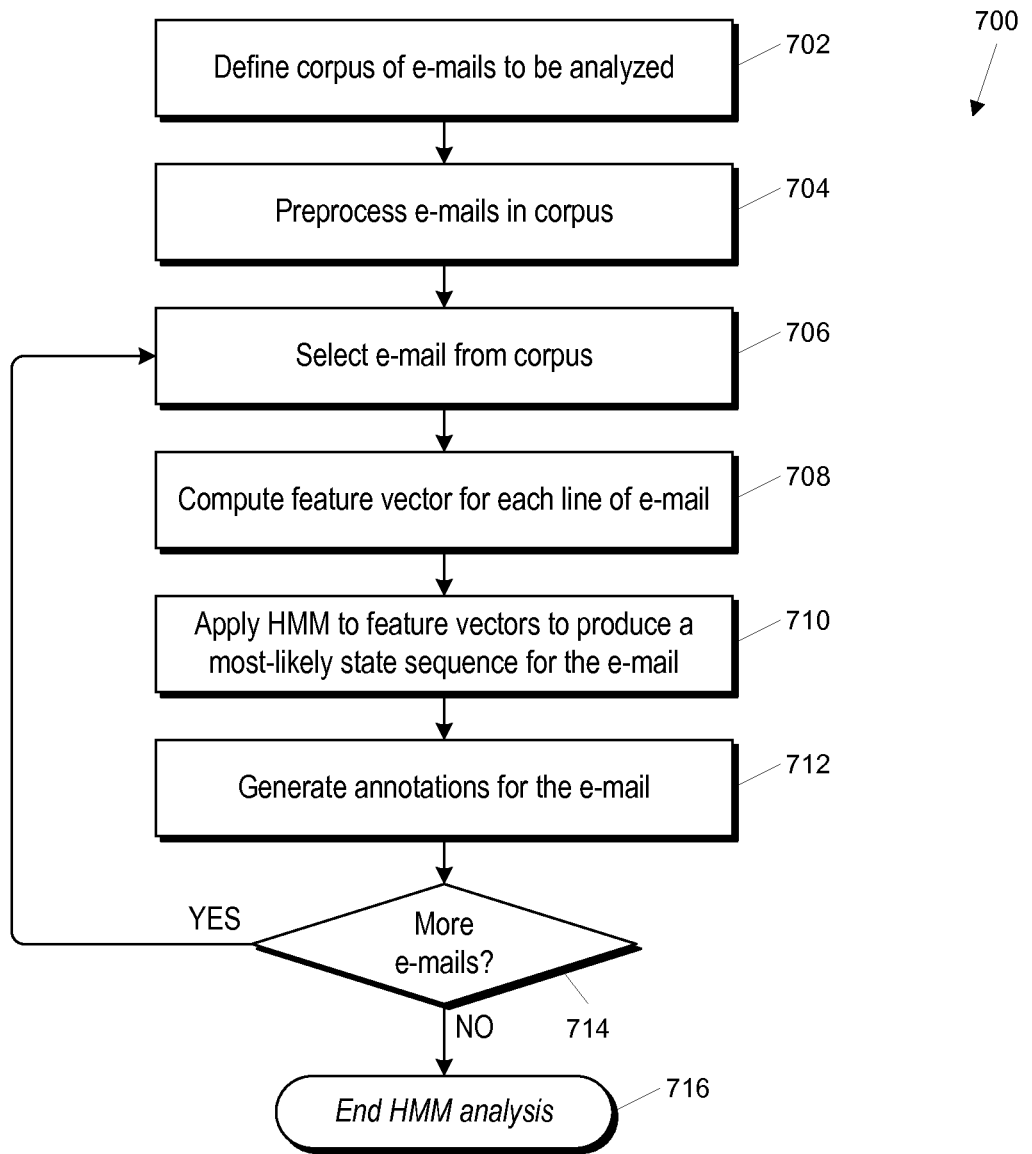
FIG. 7 is a flow diagram of a process for e-mail analysis using a hidden Markov model according to an embodiment of the present invention.

One an HMM has been trained, it can be used to analyze other e-mails. FIG. 7 is a flow diagram of a process 700 for e-mail analysis using an HMM according to an embodiment of the present invention. Process 700 includes steps related to predicting a state sequence for an e-mail using an HMM; this prediction technique can also be used during validation in process 600 described above.

At block 702, a corpus of e-mails to be analyzed is defined. The corpus can be any collection of e-mails and can be of arbitrary size. For example, a corpus can include all e-mails sent from or received at a corporate e-mail server during some time period of interest.

At block 704, the e-mails in the corpus are preprocessed. For example, if the e-mail is stored in a non-plaintext format (e.g., the well-known PST format used by the Microsoft Outlook e-mail program), a plaintext version of the e-mail can be generated. Formatting information, if available, can be omitted or represented using special characters or strings. In some instances, formatting is not sufficiently consistent across e-mails in a corpus to be helpful in parsing and no information is lost by removing the formatting. In some embodiments, preprocessing can occur before any other portion of process 700, e.g., in a separate initial intake stage of processing a document corpus.

At block 706, an e-mail is selected for analysis. E-mails from the corpus can be selected in any order. In some embodiments, filtering criteria can be applied at block 706 to skip e-mails that are known to be not of interest (e.g., known spam or e-mails known to be duplicates of e-mails that have already been analyzed); thus, not all e-mails in a corpus need be analyzed.

At block 708, a feature vector is computed for each line of the selected e-mail. Feature vector computation is advantageously based on the feature vector definition determined during training of the HMM and may involve, e.g., a series of regular expression tests as described above.

At block 710, the HMM is applied to the sequence of feature vectors for the selected e-mail to produce a most-likely state sequence. In the absence of complexity constraints, it would be possible to evaluate $P(\theta|q, \lambda)$ iteratively for all possible state sequences q and determine the most likely state sequence. This would require evaluating $N^{T+1}$ possible state sequences q, where N is the number of states and T is the number of lines in the e-mail. For a large corpus of e-mails, this is not practical given existing computational resources.

Accordingly, it is useful to employ an estimation technique that reduces complexity. For example, some embodiments use the Viterbi algorithm, which can be carried out in a computation time that is linear in sequence length T. More specifically, for a line t and a state j, a cumulative probability of the observed sequence up to that line can be defined as:

$$\alpha_t(j) = P(\theta_0, \theta_1, \ldots \theta_t, q_t = j | \lambda).$$ Eq. (12)

Figure 8:
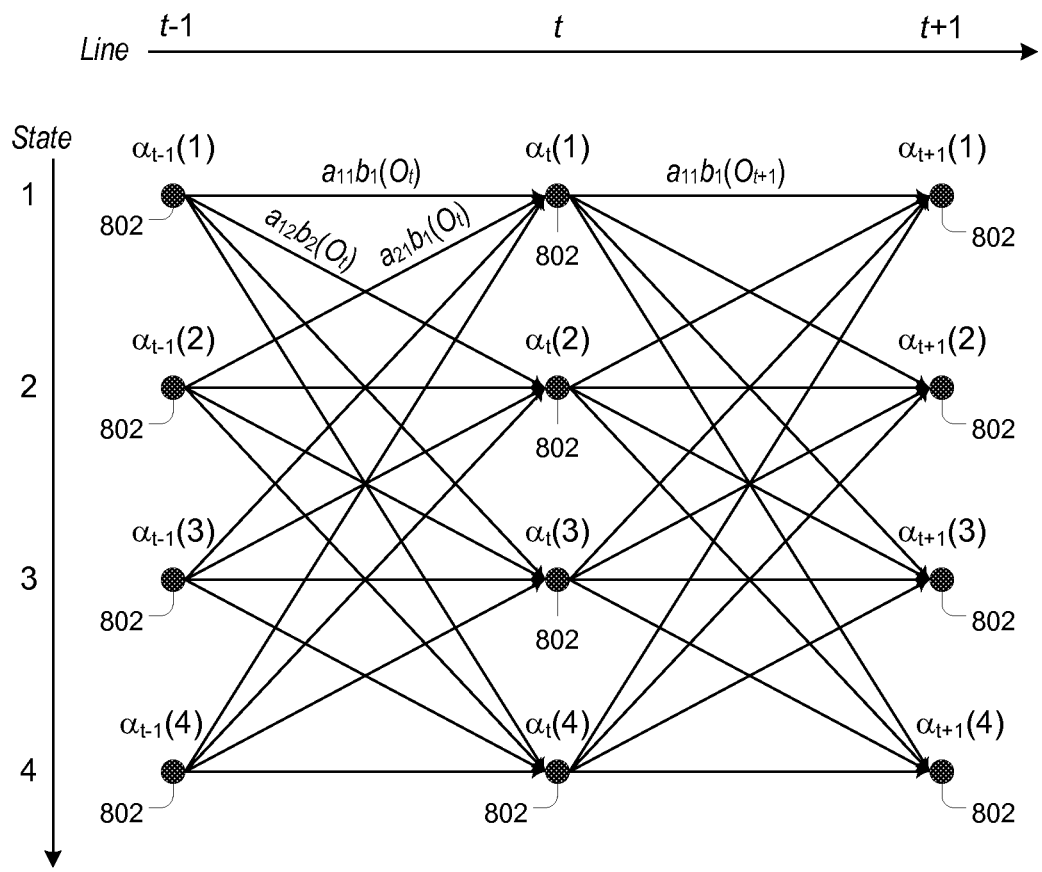
FIG. 8 illustrates a trellis model usable to determine cumulative probabilities in an embodiment of the present invention.

Assuming that between each pair of adjacent lines t−1 and t, it is possible to transition from any state to any state, a trellis model such as that shown in FIG. 8 applies. In FIG. 8, each node 802 corresponds to an e-mail being in a state j (e.g., 1, 2, 3, 4) at a particular line (e.g., t−1, t, t+1) of an e-mail. Nodes 802 corresponding to the same line are arranged vertically; nodes 802 corresponding to the same state are arranged horizontally. Possible transitions between nodes 802 are shown by arrows. While nodes 802 are shown for four states and three lines, it is to be understood that there may be any number of states (determined by the HMM) and any number of lines (determined by the length of the e-mail). The arrows are assigned line weights reflecting the probability of the transaction occurring. For example, as indicated for some of the transitions in FIG. 8, the line weight w can be:

$$w = a_{jk} b_j(\theta_t).$$ Eq. (13)

Starting from the beginning of the sequence of lines, each node 802 has a cumulative probability $\alpha_t(j)$ of being reached that depends on the line weights of the possible paths that lead to that particular node 802. As can be mathematically induced from the trellis model of FIG. 8, the cumulative probability $\alpha_t(j)$ for reaching a particular node can be computed recursively as:

$$\alpha_t(j) = \left[\sum_{i=1}^{N} \alpha_{t-1}(i) a_{ij}\right] b_j(\theta_t).$$ Eq. (14)

The Viterbi algorithm finds the shortest path for a given observation sequence through the trellis structure. Mathematically, the algorithm tries to find a state sequence that maximizes $P(q|\theta, \lambda)$. This is equivalent to maximizing $P(q, \theta|\lambda)$ because $P(\theta, \lambda)$ is a given.

Now if:

$$\delta_t(j) = \max_{q_0 q_1 \cdots q_t} P(q_0, q_1, \ldots q_t = j, \theta_0, \theta_1, \ldots, \theta_t | \lambda), \quad \text{Eq. (15)}$$

then from Eq. (8), it follows that:

$$\delta_{t-1}(j) = \left[\max_i \delta_t(i) a_{ij}\right] b_j(\theta_{t-1}). \quad \text{Eq. (16)}$$

The Viterbi algorithm uses this recursion to find the optimal state sequence. While the Viterbi algorithm is well-suited to the task of predicting a most likely state sequence, other algorithms (preferably of similar computation time or complexity) can be substituted.

Referring again to FIG. 7, once the most likely state sequence is found, annotations for the e-mail can be generated. In some embodiments, the annotations can be incorporated into an XML representation of the e-mail (like the representation used for the manually-annotated e-mails in process 600 described above). At block 714, if more e-mails remain to be analyzed, process 700 returns to block 706 to select another e-mail. If no e-mails remain, process 700 ends at block 716.

Heuristic-Based Post-Processing

As described above, the HMM analysis yields a most-likely state sequence for an e-mail, associating each line with one of the possible states. However, the analysis is probabilistic and it is expected that the error rate will be nonzero.

In some embodiments, the HMM analysis (or other probabilistic analysis that associates lines with states) can be supplemented with heuristic-based post-processing. Such processing can exploit redundancy that typically exists across a corpus of e-mails to reduce the error rate and in some instances to provide additional information about the e-mails.

For example, signature blocks are often highly redundant across e-mails from the same sender. In a common scenario, an e-mail sender defines a signature block that can be pasted into any e-mail composed by that sender; the pasting may be fully automatic or initiated by the sender on a per-message basis. In either case, the same signature block is likely to appear in many e-mails from the same sender; changes to the signature block usually happen infrequently, e.g., when the sender's job title or contact information changes.

Figure 9:
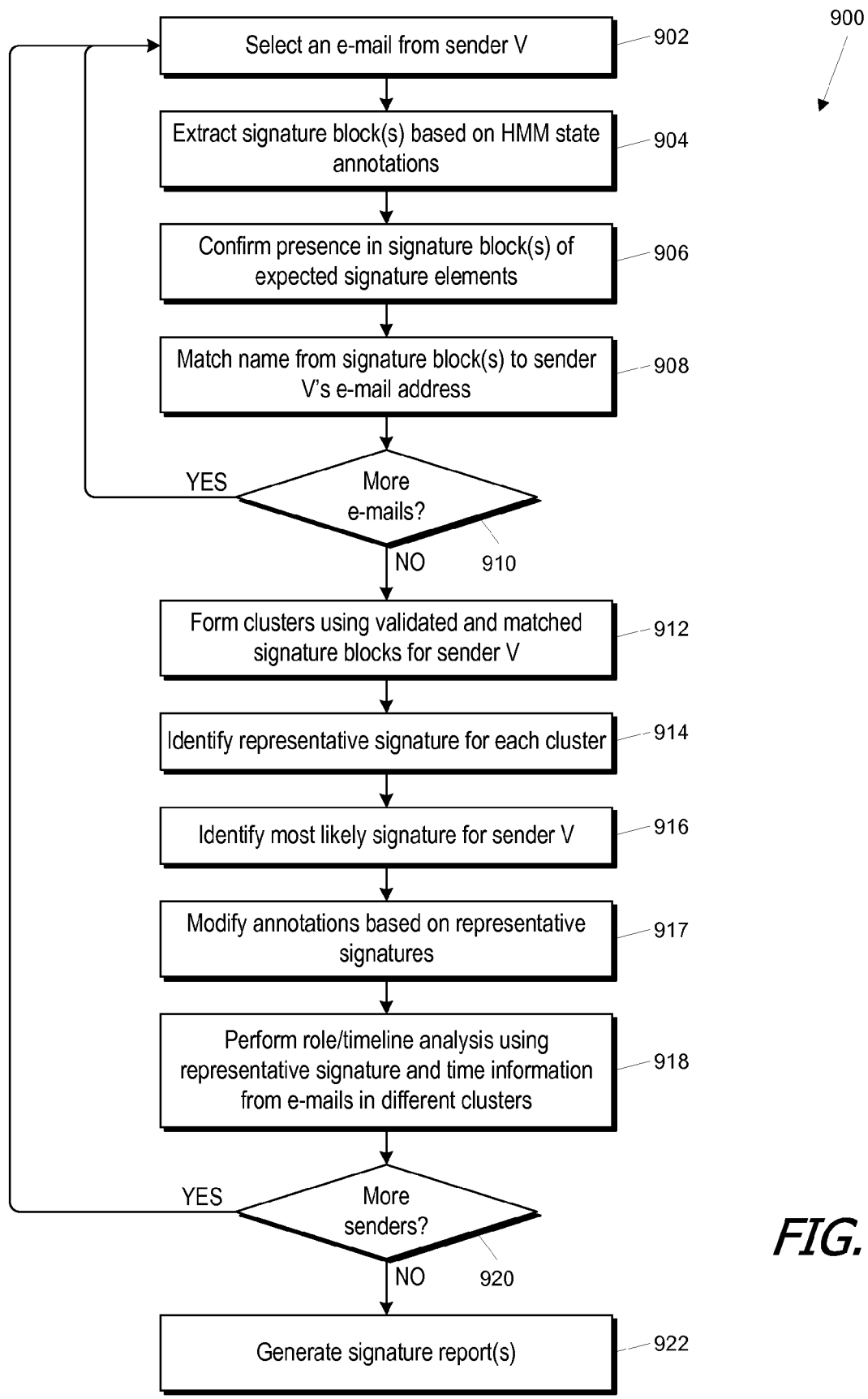
FIG. 9 is a flow diagram of a process for signature-based post-processing according to an embodiment of the present invention.

FIG. 9 is a flow diagram of a process 900 for signature-based post-processing according to an embodiment of the present invention. In this process, signature blocks identified in e-mails from a particular sender (V) are compared to detect patterns.

More specifically, at block 902, an e-mail sent by sender V is selected. For purposes of block 902, the sender can be identified by reference to metadata stored with the e-mail. At block 904, a signature block is extracted from the selected e-mail, based on the annotations added during HMM analysis (e.g., process 700 described above). In some embodiments, each extracted signature block is made up of a contiguous group of lines, each of which has been annotated as a signature line, and an e-mail can include multiple signature blocks (see, e.g., e-mail 200 of FIG. 2).

Blocks 906 and 908 illustrate validation testing that can be performed on a signature block. At block 906, it is determined whether the extracted signature block contains various elements expected in an e-mail signature block. For example, signature blocks typically include the sender's name, the name of their organization (if applicable) and contact information such as e-mail address, phone number, street address, URL, or the like. In some embodiments, presence or absence of such elements can be determined through regular expression matching. Thus, for example, it can be required that a valid signature block includes at least a personal name and at least two of the following items of contact information: an e-mail address, a phone number, or a URL. Other validation rules can be used in addition to or instead of this example. If insufficient signature elements are present in an extracted signature block, the block can be disregarded in subsequent portions of process 900.

At block 908, the personal name identified in the extracted signature block during validation can be matched against the sender's e-mail address to further validate the signature block as coming from sender V. Name matching can be used, for example, to distinguish sender V's signature from signatures of other users in the case of nested e-mails, as in e-mail 200 of FIG. 2. In some embodiments, it is assumed that the username portion of the sender's address will contain the sender's personal name (e.g., john.doe@company.com for user John Doe) or some variant thereof (e.g., jdoe@company.com), and name matching can be based on the username portion of the e-mail address and the personal name in the signature block. In other embodiments, a user directory that maps user's personal names to e-mail addresses may be available, and the personal name associated with the sender's e-mail address can be required to match a personal name identified in the extracted signature block. In some embodiments, name variants are considered in the matching; for instance, a person named Jonathan Luke Doe might choose to use a variant name in his signature, such as John Doe, J. Luke Doe, or J. L. Doe; such variant patterns can be recognized as name matches. If signature validation fails, the extracted signature block can be disregarded in subsequent portions of process 900. Name matching can help to exclude embedded signature blocks (which may be from other senders) that may be present in an e-mail sent by sender V.

At block 910, process 900 continues to extract signature blocks from sender V's e-mails until a sufficient sample of validated and matched signature blocks has been accumulated. This may or may not include processing all e-mails from sender V.

At block 912, clusters are formed using the validated and matched signature blocks. For example, a distance metric between two signature blocks can be defined by hashing each line of the signature block; the number of hashes that differ between the two blocks is used as the distance between them. K-means clustering or other known distance-based clustering algorithms can be used to group the signatures into clusters based on degree of similarity as defined by the distance metric. Each cluster can be assigned a weight in proportion to the cumulative frequency of the signatures present in the cluster.

At block 914, a representative signature for each cluster is identified. In some embodiments, the signature that occurs most frequently within a cluster is taken as representative.

At block 916, a most likely signature for sender V is identified. In some embodiments, the representative signature of the cluster with the greatest weight is selected as most likely.

At block 917, the annotations for e-mails sent by sender V can be modified based on the representative signatures. For example, if a particular e-mail did not have an identified signature block, lines from the e-mail can be compared to sender V's representative signatures to detect a match; if a match is detected, the matching lines can be re-annotated as signature lines. As another example, within each cluster, the different variants of the signature block (and surrounding lines from the e-mails that contain the variants) can be compared to the representative signature for the cluster. This can help to detect instances where lines adjacent to but not in V's signature block were misidentified in the HMM analysis as signature lines and/or instances where lines that are part of V's signature were misidentified as not being signature lines.

At block 918, role and timeline analysis can be performed. For example, for each cluster or each distinct signature block, an earliest and latest date of use can be determined from the signature blocks in the e-mails. A timeline can be constructed indicating when the sender started or stopped using various signatures. Further, if organizational role information can be extracted from the signature blocks (e.g., if the blocks include a job title), the person's organizational role and changes therein can be determined as well.

At block 920, it is determined whether e-mails from other senders should be processed. If so, process 900 returns to block 902 to select an e-mail from a different sender.

Once signature analysis is complete, various reports based on signature information can be generated. For example, a report showing the most likely signature for each sender can be generated. Another report can provide representative signatures and timeline information for a particular sender (or multiple senders) based on the clustering described above. This report can also provide an indication of the various roles the sender has held in the organization. A third report can indicate, e.g., based on role information, which signatures should be regarded as likely privileged. For example, emails signed by an attorney (e.g., general counsel, law firm attorney) are likely to be privileged.

As another example of heuristic-based post-processing, disclaimer blocks are often highly redundant across e-mails from the same individual or in some cases organization. Like a signature block, a disclaimer block can be defined by a user and automatically pasted into an e-mail during composition. In addition, in some cases, an organization defines a disclaimer block and configures its e-mail server to automatically append this block to all outgoing e-mails. Thus, identical or very similar disclaimer blocks can be expected to appear across many e-mails.

Figure 10:
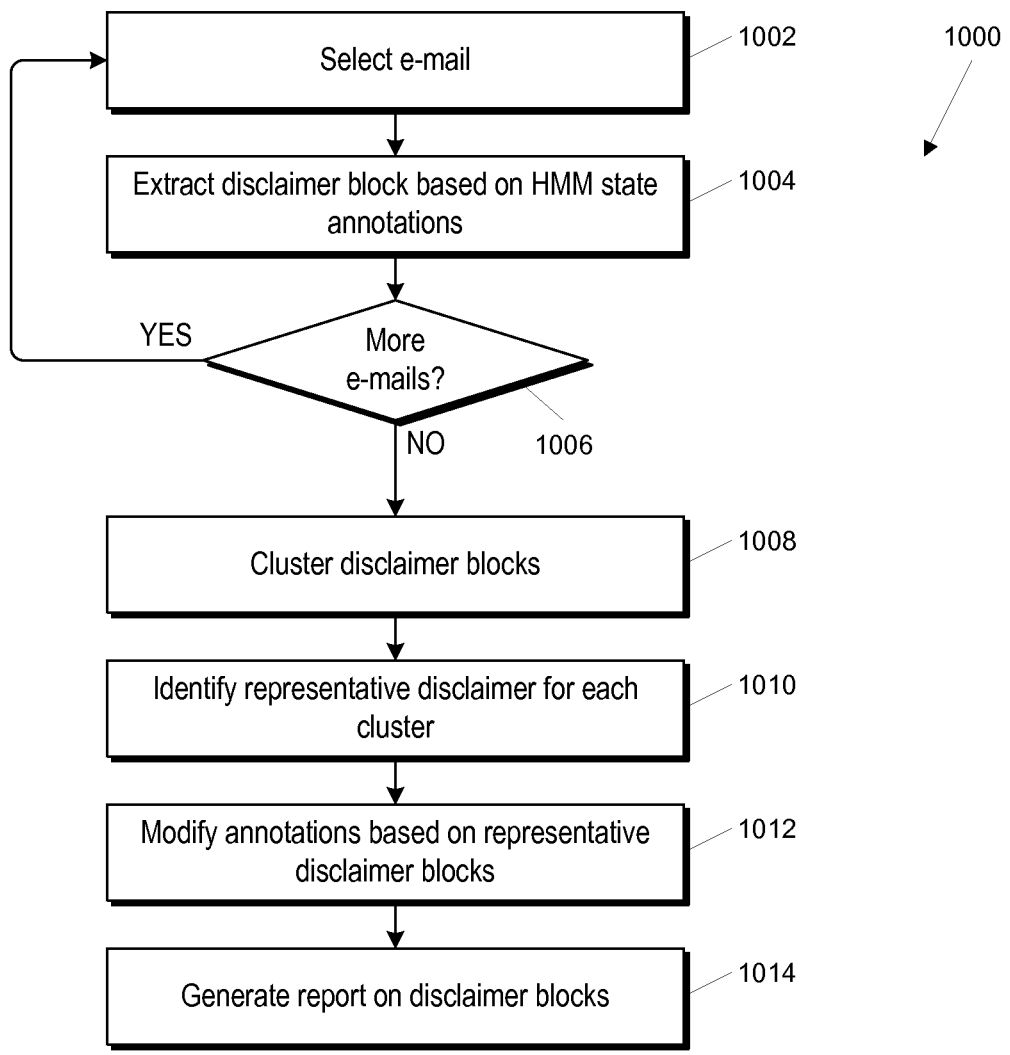
FIG. 10 is a flow diagram of a process for post-processing of disclaimer blocks according to an embodiment of the present invention.

FIG. 10 is a flow diagram of a process 1000 for post-processing of disclaimer blocks according to an embodiment of the present invention. At block 1002 an e-mail is selected. In one embodiment, e-mails from the same sender are considered together; in another embodiment, e-mails from all senders within an organization are considered together. Other groupings may be used.

At block 1004, a disclaimer block is extracted from the e-mail, based on the annotations added during HMM analysis (e.g., process 700 described above). In some embodiments, each extracted disclaimer block is made up of a contiguous group of lines, each of which has been annotated as a disclaimer line, and an e-mail can include multiple disclaimer blocks. In some embodiments, each extracted disclaimer block can be validated, e.g., by confirming the presence of one or more disclaimer-related keywords within the block.

At block 1006, process 1000 determines whether more e-mails should be considered. If so, process 1000 returns to step 1002 to process the next e-mail.

Once disclaimer blocks have been extracted, at block 1008, the blocks can be clustered. For example, a distance metric can be defined as the dot product of the word count vectors between two disclaimer blocks. For this application, a word count vector can be defined by associating each vector component with a word and counting the number of occurrences of that word in the disclaimer block; examples of constructing word-count vectors are known in the art. K-means clustering or other known distance-based clustering algorithms can then be used to group the signatures into clusters based on degree of similarity as defined by the distance metric. Clustering can be done without regard to sender, allowing patterns in the disclaimers used at an organizational level to be discovered.

At block 1010, a representative disclaimer block for each cluster can be identified. In some embodiments, the disclaimer block that occurs most frequently within a cluster is taken as representative.

At block 1012, the annotations of various e-mails can be modified based on the representative disclaimer blocks. For example, if a particular e-mail did not have an identified disclaimer block, lines from the e-mail can be compared to one or more of the representative disclaimer blocks to detect a match; if a match is detected, the matching lines can be re-annotated as disclaimer lines. As another example, within each cluster, the different variants of the disclaimer block (and surrounding lines from the e-mails that contain the variants) can be compared to the representative disclaimer block for the cluster. This can help to detect instances where lines adjacent to but not in a disclaimer block were misidentified in the HMM analysis as disclaimer lines and/or instances where lines that are part of a disclaimer block were misidentified as not being disclaimer lines.

At block 1014, a report regarding disclaimers can be generated. As with signatures, the representative disclaimer block for each cluster and a most likely disclaimer block across multiple clusters can be included in reports. Time evolution of disclaimers can also be reported. Additional analysis can also be performed. For example, users who use the same or highly similar disclaimers may be in the same organization or in the same internal group within the organization. (As one example, an engineering department and a legal department within a corporation may have different recommended or prescribed disclaimers; in this scenario, the disclaimer block may correlate with a sender's departmental affiliation.)

These examples of heuristic-based post-processing are illustrative and other such processing can be used in addition to or instead of these examples. For instance, some organizations provide employees with a signature template; thus, the types and arrangement of signature-block information may be consistent across many employees, with the only difference being in the particulars (i.e., whose name, phone number, etc. appears). By comparing signatures across different senders in an organization, a template or pattern may be discovered. This template or pattern in turn can be used to facilitate recognition of signature blocks in other e-mails and update the original HMM annotations. In turn, the updated annotations can be used to refine the signature analysis for a particular sender, which may result in a more complete or more reliable representation of that sender's role and its evolution.

Additional Applications for E-Mail Parsing

The e-mail parsing techniques described above provide automated methods for distinguishing among parts of an e-mail, such as headers, body, signature and disclaimer. As noted above, the ability to parse e-mail can facilitate signature-block analysis, such as identifying and understanding roles played by various e-mail senders and the evolution of those roles. In addition, knowing a sender's role can help in assessing the likelihood that the sender's e-mails should be treated as privileged (e.g., not produced to the opponent in electronic document discovery during litigation). For example, attorneys may be identified by job titles such as General Counsel or organizational affiliations such as a law firm. Information extracted from signatures can be used to identify attorneys (or likely attorneys). E-mails that contain the signatures of attorneys, including e-mails sent by the attorney as well as other e-mails in which the attorney's signature block is embedded (e.g., replies to or forwards of an attorney's e-mail), can be identified. In some embodiments related to electronic document discovery in litigation, such e-mails are presumed to be privileged.

Parsing of e-mails has numerous other applications. For example, existing document analysis systems can perform semantic clustering or classification that attempts to identify documents related to similar subject matter based on similarity of content. Such systems can be misled by e-mails, given that an e-mail can include headers, signatures and disclaimers that are often irrelevant to the actual subject of the e-mail. These conceptually irrelevant items can constitute a large fraction of the total e-mail content (see, e.g., the e-mail of FIG. 2) and can affect the accuracy of clustering or classification. E-mail parsing that allows body lines (which typically contain the substance of the e-mail) to be distinguished from the rest can improve the reliability of semantic clustering or classification. For example, an e-mail can be clustered or classified based solely on content in the body (as identified by the parsing algorithm); headers, signatures, and disclaimers can be ignored.

Similarly, some document analysis systems provide detection of documents that are highly similar to each other, sometimes referred to as near-duplicates. Parsing of an e-mail provides additional information about the e-mail's structure, and this information can facilitate near-duplicate detection. For example, a leading header and body in one e-mail may be compared to an embedded header and body in another e-mail. If the second e-mail is a reply to the first, there will often be a match. If a pair of e-mail messages differ only in the presence or absence of a leading header and body, they can be considered near-duplicates. (In some embodiments, the decision to classify the e-mails as near-duplicates may also depend on the size of the added body.)

As another example, it is sometimes useful to identify e-mail threads—sequences of related e-mails exchanged among two or more users. Often, header information contains important clues to e-mail threading, and embedded headers from replied-to or forwarded messages can be helpful in this regard. By facilitating identification of such headers, the e-mail parsing techniques described herein can provide improved identification of threads. In addition, comparing embedded headers and/or body portions can help to identify "branching" threads, e.g., where multiple replies are sent to the same message, some of which may lead to further replies.

In yet another example, some document analysis systems attempt to determine the language of a document. Such analysis can be affected by e-mail headers and/or signatures, which often do not provide enough semantic clues to indicate a language. Limiting language determination for an e-mail to portions (e.g., body and disclaimer) that are likely to be in a recognizable language can improve the accuracy of language determination.

Further Embodiments

While the invention has been described with respect to specific embodiments, one skilled in the art will recognize that numerous modifications are possible. For instance, the hidden Markov model described herein uses six states—title, header, body, signature, disclaimer, and end of e-mail. Other models may use other states and other combinations of states, and the number of states can be varied.

Feature vectors can be based on any feature of a line of text that a computer can be programmed to detect. In embodiments described above, features related to formatting of the lines are not considered; in alternative embodiments, such features may be considered.

In addition, the foregoing description makes reference to specific algorithms that can be used in an analysis process, including particular algorithms for training and applying an HMM. It will be appreciated that other algorithms can be used; for example, in the context of signature block analysis, the analysis can be independent of the particular technique used to identify signature blocks.

As described above, embodiments of the present invention may be implemented as computer programs. Such programs may be encoded on various computer readable media for storage and/or transmission; suitable media include magnetic disk or tape, optical storage media such as compact disk (CD) or DVD (digital versatile disk), flash memory, and the like. Computer readable media encoded with the program code may be packaged with a device (e.g., microprocessor) capable of executing the program or provided separately from such devices.

In addition, while the embodiments described above may make reference to specific hardware and software components, those skilled in the art will appreciate that different combinations of hardware and/or software components may also be used and that particular operations described as being implemented in hardware might also be implemented in software or vice versa.

Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Thus, although the invention has been described with respect to specific embodiments, it will be appreciated that the invention is intended to cover all modifications and equivalents within the scope of the following claims.

What is claimed is:

1. A method comprising:
    training, in a computer system, an e-mail analyzer that is based on a hidden Markov model, wherein the training uses a set of training e-mail messages, each training e-mail message having a plurality of lines, wherein the hidden Markov model models associations between lines of an e-mail message and a plurality of line types, wherein the plurality of line types include at least a signature type and a disclaimer type;
    applying, in the computer system, the trained e-mail analyzer to a target e-mail message having a plurality of lines to assign each line of the target e-mail message to one of the plurality of line types; and
    storing annotations for the target e-mail message in a data store, the annotations indicating the assigned line type for each line of the target e-mail message.

2. The method of claim 1 wherein training the e-mail analyzer includes:
   receiving information relating to manual association of each of the lines of each of the training e-mail messages with one of the plurality of line types;
   creating a feature vector representation for each line of each of the training e-mail messages; and
   optimizing parameters associated with the hidden Markov model, wherein the optimizing uses a forward backward algorithm applied to the manual associations and the feature vector representations.

3. The method of claim 2 wherein training the e-mail analyzer includes performing a validation process using a set of validation e-mail messages, each validation e-mail message having a plurality of lines, the validation process including:
   manually associating each of the lines of each of the validation e-mail messages with one of the plurality of line types;
   creating a feature vector representation for each line of each of the validation e-mail messages;
   using a Viterbi algorithm and the optimized parameters associated with the hidden Markov model to determine a most probable line type for each line of the target e-mail message;
   for at least some of the lines of the validation e-mail messages; comparing the most probable line type to the manually associated line type; and
   determining, based on the comparing, a performance metric for the e-mail analyzer,
   wherein in the event that the performance metric fails to satisfy an acceptability criterion, the training process is continued with additional training e-mail messages.

4. The method of claim 1 wherein the plurality of line types further include at least a header type and a body type.

5. A method comprising:
   training, in a computer system, an e-mail analyzer that is based on a hidden Markov model, wherein the training uses a set of training e-mail messages, each training e-mail message having a plurality of lines, wherein the hidden Markov model models associations between lines of an e-mail message and a plurality of line types;
   applying, in the computer system, the trained e-mail analyzer to a target e-mail message having a plurality of lines to assign each line of the target e-mail message to one of the plurality of line types; and
   storing annotations for the target e-mail message in a data store, the annotations indicating the assigned line type for each line of the target e-mail message,
   wherein training the e-mail analyzer includes:
   receiving information relating to manual association of each of the lines of each of the training e-mail messages with one of the plurality of line types;
   creating a feature vector representation for each line of each of the training e-mail messages; and
   optimizing parameters associated with the hidden Markov model, wherein the optimizing uses a forward backward algorithm applied to the manual associations and the feature vector representations, and
   wherein applying the trained e-mail analyzer includes:
   creating a feature vector representation for each line of the target e-mail message; and
   using a Viterbi algorithm and the optimized parameters associated with the hidden Markov model to determine a most probable line type for each line of the target e-mail message, wherein the line is assigned to the most probable line type.

6. A method comprising:
   training, in a computer system, an e-mail analyzer that is based on a hidden Markov model, wherein the training uses a set of training e-mail messages, each training e-mail message having a plurality of lines, wherein the hidden Markov model models associations between lines of an e-mail message and a plurality of line types;
   applying, in the computer system, the trained e-mail analyzer to a target e-mail message having a plurality of lines to assign each line of the target e-mail message to one of the plurality of line types;
   storing annotations for the target e-mail message in a data store, the annotations indicating the assigned line type for each line of the target e-mail message; and
   establishing a definition for a feature vector usable to represent a line of an e-mail message, wherein the feature vector includes a plurality of bits, each bit indicating presence or absence of an associated one of a plurality of features,
   wherein the training of the e-mail analyzer includes generating a feature vector for each line of the training e-mail messages using the feature vector definition and the applying of the trained e-mail analyzer includes generating a feature vector for each line of the target e-mail message using the feature vector definition.

7. The method of claim 6 wherein establishing the definition for the feature vector includes:
   defining a plurality of regular expression tests, wherein each regular expression test detects whether one or more regular expressions is present in the line of the e-mail message being represented; and
   associating each of the plurality of regular expression tests with a different one of the bits in the bit vector.

8. The method of claim 7 wherein the plurality of regular expression tests include at least one test from a group consisting of:
   a first test that determines whether the line includes a character string associated with an e-mail header;
   a second test that determines whether the line contains a string having e-mail address syntax;
   a third test that determines whether the line contains a string having uniform resource locator syntax;
   a fourth test that determines whether the line contains a string having phone number syntax;
   a fifth test that determines whether the line has contiguous text;
   a sixth test that determines whether the line includes one or more words associated with a disclaimer;
   a seventh test that determines whether the line contains a string having date syntax;
   an eighth test that determines whether the line contains a string corresponding to a personal name;
   a ninth test that determines whether the line includes one or more keywords associated with an organizational role;
   a tenth test that determines whether the line includes a string having street address syntax; and
   an eleventh test that determines whether the line is blank.

9. A method comprising:
   training, in a computer system, an e-mail analyzer that is based on a hidden Markov model, wherein the training uses a set of training e-mail messages, each training e-mail message having a plurality of lines, wherein the hidden Markov model models associations between lines of an e-mail message and a plurality of line types;
   applying, in the computer system, the trained e-mail analyzer to a plurality of target e-mail messages, each target e-mail message having a plurality of lines, to assign each line of each of the target e-mail messages to one of the plurality of line types;

extracting, from each of the plurality of target e-mail messages, a block of consecutive lines that were each assigned to a first one of the line types;

forming a plurality of clusters of the blocks based on similarity of lines in different blocks; and for each of the plurality of clusters, determining a representative block.

10. The method of claim 9 wherein the first one of the line types corresponds to a signature type.

11. The method of claim 9 wherein the first one of the line types corresponds to a disclaimer type.

12. The method of claim 9 further comprising:

modifying the line type assignments for at least some of the lines of at least some of the target e-mail messages based on the representative blocks determined for the plurality of clusters.

13. A computer system comprising:

a document information data store configured to store information about a plurality of e-mail messages;

a processor coupled to the document information data store, the processor being configured to:

train an e-mail analyzer that is based on a hidden Markov model, wherein the training uses a set of training e-mail messages, each training e-mail message having a plurality of lines, wherein the hidden Markov model models associations between lines of an e-mail message and a plurality of line types;

apply the trained e-mail analyzer to a plurality of target e-mail messages, each target e-mail message having a plurality of lines, to assign each line of each of the target e-mail messages to one of the plurality of line types;

extract, from each of the plurality of target e-mail messages, a block of consecutive lines that were each assigned to a first one of the line types;

form a plurality of clusters of the blocks based on similarity of lines in different blocks; and for each of the plurality of clusters, determine a representative block.

14. The computer system of claim 13 wherein the processor is further configured such that training the hidden Markov model includes:

receiving information relating to manual association of each of the lines of each of the training e-mail messages with one of the plurality of line types;

creating a feature vector representation for each line of each of the training e-mail messages; and optimizing parameters associated with the hidden Markov model, wherein the optimizing uses a forward backward algorithm applied to the manual associations and the feature vector representations.

15. The computer system of claim 14 wherein the processor is further configured such that applying the hidden Markov model includes:

creating a feature vector representation for each line of each target e-mail message; and using a Viterbi algorithm and the optimized parameters associated with the hidden Markov model to determine a most probable line type for each line of each target e-mail message, wherein the line is assigned to the most probable line type.

16. The computer system of claim 13 wherein the plurality of line types include at least a header type, a body type, a signature type, and a disclaimer type.

17. The computer system of claim 13 further comprising:

modifying the line type assignments for at least some of the lines of at least some of the target e-mail messages based on the representative blocks determined for the plurality of clusters.

18. A method comprising:

analyzing, in a computer system, a plurality of e-mails from a sender using an e-mail analyzer based on a hidden Markov model, wherein the analyzing includes associating, based on the hidden Markov model, each line of an e-mail with one of a plurality of line types, the plurality of line types including a signature type;

extracting, in the computer system, from the plurality of e-mails a plurality of signature blocks, wherein each signature block includes a plurality of contiguous lines of the e-mail that are each associated with the signature type;

validating, in the computer system, the signature blocks;

forming, in the computer system, one or more clusters of signature blocks based on a degree of similarity thereof; and determining, in the computer system, a most likely signature for the sender based on the one or more clusters.

19. The method of claim 18 wherein the one or more clusters include at least two clusters, the method further comprising:

determining a representative signature for each of the at least two clusters;

performing a role and timeline analysis based on the representative signatures of the clusters and date information associated with the e-mails from which the signature blocks in each cluster were extracted; and generating a report based on the role and timeline analysis, wherein the report identifies likely roles associated with the sender at different times.

20. The method of claim 18 wherein validating the signature blocks includes:

confirming that each signature block includes a personal name and at least two items from a plurality of contact information items.

21. The method of claim 20 wherein the plurality of contact information items includes an e-mail address, a telephone number, and a uniform resource locator.

22. The method of claim 20 wherein validating the signature blocks further includes:

matching the personal name in each signature block to a sender's e-mail address associated with the e-mail.

23. The method of claim 18 wherein the clusters are formed using a distance based clustering algorithm and wherein the distance between two signature blocks is determined by computing a hash from each line of the signature blocks and determining the number of hashes that differ between the two blocks.

* * * * *